United States Patent
Ewing et al.

(10) Patent No.: US 8,204,971 B2
(45) Date of Patent: *Jun. 19, 2012

(54) SYSTEMS AND METHODS FOR DYNAMICALLY CONFIGURING NODE BEHAVIOR IN A SENSOR NETWORK

(75) Inventors: David B. Ewing, Madison, AL (US); Rick A. Martindale, Huntsville, AL (US)

(73) Assignee: Synapse Wireless, Inc., Huntsville, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/114,819

(22) Filed: May 24, 2011

(65) Prior Publication Data
US 2011/0231533 A1    Sep. 22, 2011

Related U.S. Application Data

(63) Continuation of application No. 12/114,566, filed on May 2, 2008, now Pat. No. 7,790,871.

(60) Provisional application No. 60/915,536, filed on May 2, 2007, provisional application No. 60/915,552, filed on May 2, 2007, provisional application No. 60/915,571, filed on May 2, 2007, provisional application No. 60/937,031, filed on Jun. 25, 2007, provisional application No. 60/953,630, filed on Aug. 2, 2007, provisional application No. 60/915,458, filed on May 2, 2007.

(51) Int. Cl.
*G06F 15/16* (2006.01)

(52) U.S. Cl. ........................................ 709/221; 702/104

(58) Field of Classification Search .......... 709/200–203, 709/217–230
See application file for complete search history.

(56) References Cited

U.S. PATENT DOCUMENTS

| | | | |
|---|---|---|---|
| 6,859,831 B1 | 2/2005 | Gelvin et al. | |
| 6,912,715 B2 | 6/2005 | Gao et al. | |
| 7,047,536 B1 | 5/2006 | Duncan et al. | |
| 7,328,243 B2 | 2/2008 | Yeager et al. | |
| 7,406,401 B2 | 7/2008 | Ota et al. | |
| 7,593,752 B2 * | 9/2009 | Ara et al. | 455/561 |
| 7,676,805 B2 * | 3/2010 | Yu et al. | 717/176 |
| 7,788,970 B2 * | 9/2010 | Hitt et al. | 73/73 |
| 7,817,047 B1 * | 10/2010 | Brignone et al. | 340/573.4 |
| 7,924,150 B2 * | 4/2011 | Baldus et al. | 340/539.12 |
| 7,970,871 B2 * | 6/2011 | Ewing et al. | 709/220 |

(Continued)

FOREIGN PATENT DOCUMENTS
WO    03090411    10/2003

*Primary Examiner* — Moustafa M Meky
(74) *Attorney, Agent, or Firm* — Lanier Ford Shaver & Payne, P.C.; Jon E. Holland

(57) ABSTRACT

The present disclosure generally pertains to systems and methods for controlling sensor networks. A sensor network has a plurality of sensor nodes, which have sensors for monitoring operational parameters of devices within an application-specific system. A wireless communication module is provided for each node to enable the node to wirelessly communicate with other nodes of the network. A user defines various scripts for controlling the behavior of one or more nodes, and the network distributes the scripts, as appropriate, to various nodes thereby implementing the behavior defined by the scripts. Accordingly, a user can easily and dynamically configure or re-configure the behavior of any node without having to physically access the node that is being configured or re-configured.

6 Claims, 10 Drawing Sheets

U.S. PATENT DOCUMENTS

| | | |
|---|---|---|
| 2003/0058277 A1 | 3/2003 | Bowman-Amuah |
| 2005/0129097 A1 | 6/2005 | Strumpf et al. |
| 2006/0031426 A1* | 2/2006 | Mesarina et al. ............ 709/220 |
| 2006/0282498 A1 | 12/2006 | Muro |
| 2007/0250930 A1 | 10/2007 | Aziz et al. |
| 2008/0111885 A1* | 5/2008 | Voglewede et al. ........... 348/152 |
| 2008/0137624 A1* | 6/2008 | Silverstrim et al. .......... 370/338 |
| 2008/0150360 A1 | 6/2008 | Vezza et al. |
| 2008/0229415 A1 | 9/2008 | Kapoor et al. |
| 2011/0099126 A1* | 4/2011 | Belani et al. .................. 705/418 |

* cited by examiner

SYSTEMS AND METHODS FOR DYNAMICALLY CONFIGURING NODE BEHAVIOR IN A SENSOR NETWORK

CROSS REFERENCE TO RELATED APPLICATIONS

This application is a continuation of U.S. patent application Ser. No. 12/114,566, entitled "Systems and Methods for Dynamically Configuring Node Behavior in a Sensor Network," and filed on May 2, 2008, which is incorporated herein by reference and claims priority to U.S. Provisional Patent Application No. 60/915,536, entitled "Wireless Communication Modules," and filed on May 2, 2007, which is incorporated herein by reference. U.S. patent application Ser. No. 12/114,566 also claims priority to U.S. Provisional Patent Application No. 60/915,552, entitled "Nodes for Wireless Sensor Networks," and filed on May 2, 2007, which is incorporated herein by reference, and to U.S. Provisional Patent Application No. 60/915,571, entitled "Sensor Networks," and filed on May 2, 2007, which is incorporated herein by reference. U.S. patent application Ser. No. 12/114,566 further claims priority to U.S. Provisional Patent Application No. 60/937,031, entitled "Sensor Networks," and filed on Jun. 25, 2007, which is incorporated herein by reference and to U.S. Provisional Patent Application No. 60/953,630, entitled "Sensor Networks," and filed on Aug. 2, 2007, which is incorporated herein by reference. U.S. patent application Ser. No. 12/114,566 also claims priority to U.S. Provisional Patent Application No. 60/915,458, entitled "Protocols for Wireless Communication," and filed on May 2, 2007, which is incorporated herein by reference.

RELATED ART

A sensor network, such as a wireless sensor network (WSN), has various nodes, referred to herein as "sensor nodes," that monitor sensors for sensing various events. For example, a sensor network may be employed in a factory or other manufacturing facility to monitor the operation of various devices or systems. As a mere example, a sensor may detect a temperature of a motor so that a warning may be provided if the temperature exceeds a specified threshold thereby indicating that an overheating condition is occurring. Further, the sensor network may be configured to provide automatic control of various devices based on sensed conditions. For example, in the foregoing example in which a sensor detects overheating of a motor, the sensor network may be configured to automatically shut down the overheating motor or take some other action, such as transmitting a warning message to an operator who can then investigate the overheating condition.

Although a sensor can be very useful in monitoring and controlling various devices and/or systems, implementing a sensor network can be very burdensome and costly. Indeed, the functionality of a sensor network is often application-specific such that a sensor network needs to be custom designed, to at least some extent, for its intended use. Further, for a WSN, enabling wireless communication can add an additional layer of complexity and cost. In this regard, a WSN is sometimes implemented in a noisy environment, such as within a manufacturing facility, requiring a very robust communication system. Moreover, designing a suitable sensor network for a desired application can be difficult, costly, and time consuming.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for controlling sensor networks. A sensor network has a plurality of sensor nodes, which have sensors for monitoring operational parameters of devices within an application-specific system. A wireless communication module is provided for each node to enable the node to wirelessly communicate with other nodes of the network. A user defines various scripts for controlling the behavior of one or more nodes, and the network distributes the scripts, as appropriate, to various nodes thereby implementing the behavior defined by the scripts. Accordingly, a user can easily and dynamically configure or re-configure the behavior of any node without having to physically access the node that is being configured or re-configured.

Figure 1:
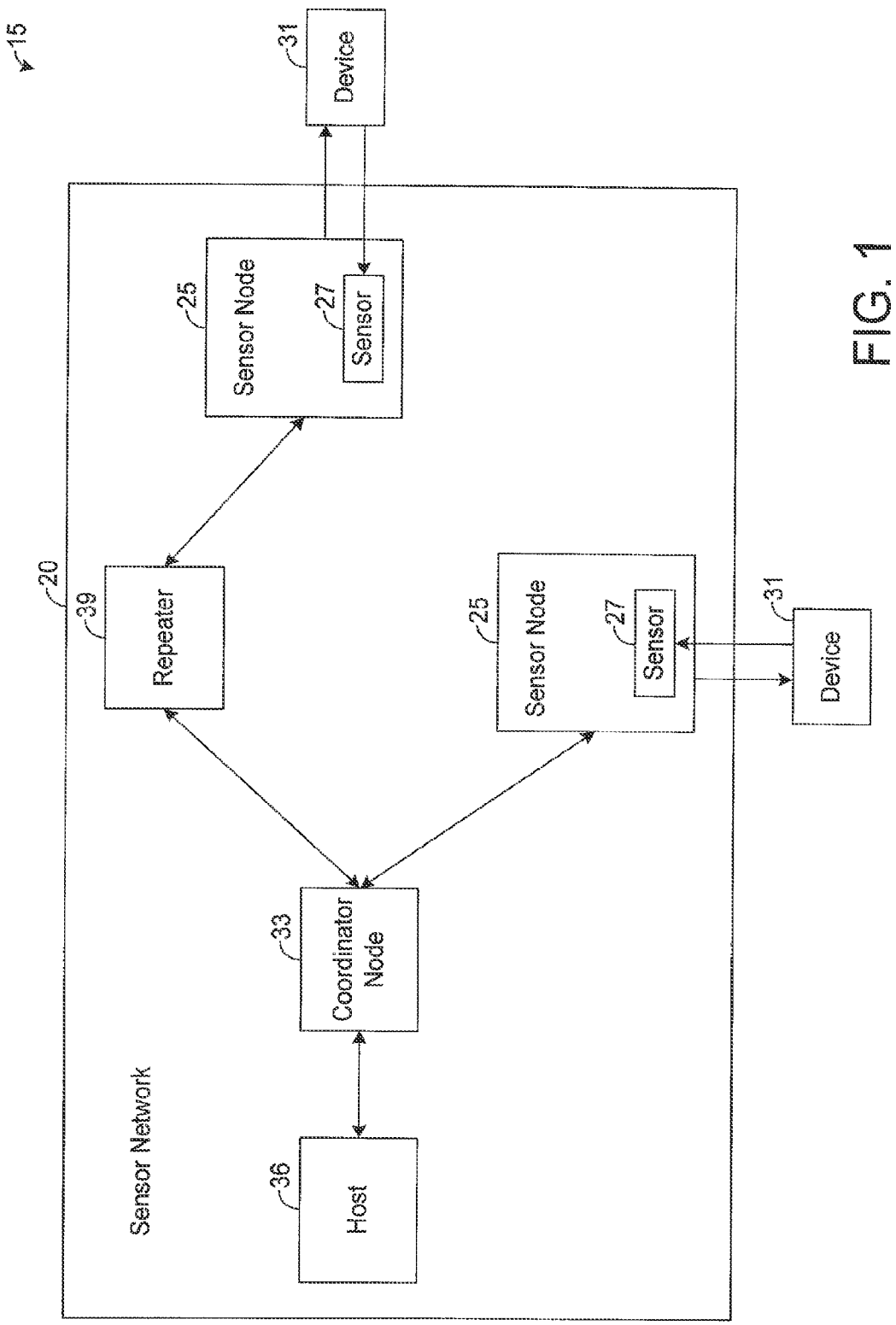
FIG. 1 is a block diagram illustrating a sensor network in accordance with an exemplary embodiment of the present disclosure.

FIG. 1 depicts a system 15 that employs a sensor network 20 in accordance with an exemplary embodiment of the present disclosure. As shown by FIG. 1, the network 20 has a plurality of nodes 25, referred to herein as "sensor nodes," that have sensors 27 for sensing various parameters and events. In one exemplary embodiment, each sensor 27 is coupled to and senses an operational parameter of a device 31. As a mere example, the network 20 may monitor the operation of a manufacturing facility, and the sensors 27 may monitor operational parameters of equipment within the manufacturing facility. For example, one of the sensors 27 may sense a temperature of a motor, as described above in the Related Art section. Another sensor 27 may detect when a door opens. Various other types of parameters and/or events may sensed by the sensors 27 in other examples. Note that FIG. 1, for simplicity, shows three nodes 25, 33, but the network 20 may have any number of nodes 25, 33 in other embodiments. U.S. Provisional Application No. 60/915,552 describes various exemplary node configurations that may be employed for any of the nodes 25, 33. Exemplary sensor networks and components thereof are described in U.S. Provisional Application No. 60/937,031.

At least one node 33 of the network 20, referred to herein as the "coordinator node," is responsible for coordinating and/or controlling various aspects of the network 20. As an example, the coordinator node 33 is configured to receive data, referred to herein as "sensor data," from the sensor nodes 25. Such data is indicative of events that have been sensed by the sensors 27 of node 25. The coordinator node 33 determines what, if any, actions are to be taken in response to each sensed event and to then coordinate such actions. For example, the coordinator 33 may transmit an instruction to any of the sensor nodes 25 to perform a specific action in response to an event that has been sensed by any of the sensor nodes 25. As a mere example, the coordinator node 33 may be configured to instruct one of the sensor nodes 25 to activate a relay (not shown) in response to a particular event, such as a temperature exceeding a threshold or a door opening. In one example, the relay may be coupled to a motor that is shut down or controlled in some other manner in response to the event. In another example, the relay may be coupled to a light source and activate the light source when one of the sensor nodes 25 detects a door opening. Various other types of sensed events and actions in response to sensed events are possible in other examples.

In the embodiment shown by FIG. 1, the coordinator node 33 is coupled to a host 36. The host 36 configures the coordinator node 33 based on the intended use of the network 20. In this regard, the host 36 has various user interfaces, as will be described in more detail hereafter, that enable a user to provide inputs and receive outputs. Thus, the user is able to communicate with the coordinator node 33 via the host 36, although it is possible in other embodiments for the user to provide inputs directly to and receive outputs directly from the coordinator node 33. Indeed, it is possible to equip the coordinator node 33 with user input and/or output devices such that implementation of a host 36 is unnecessary.

Once the coordinator node 33 has been configured for its intended application, the host 36 can be removed from the network 20. Alternatively, the host 36 may remain in communication with the coordinator node 33 to receive various information, such as sensed parameters, from the coordinator node 33 thereby allowing a user to monitor the network 20 and/or device 31 via host 36. Further, the user may use host 36 to provide various control inputs. For example, rather than having the coordinator node 33 shut down a motor in response to a temperature reading, as described above in at least one example, the coordinator node 33 may provide information regarding the temperature reading to the user via the host 36. The user may then decide whether the motor is to be shut down and, if so, provide inputs for causing the coordinator node 33 to coordinate an action specified by the user.

In one exemplary embodiment, the communication between the nodes of network 20 is wireless, e.g., radio frequency (RF). In other embodiments, the communication may occur over physical media instead of being wireless, and other frequency ranges are possible. As shown by FIG. 1, the coordinator node 33 may communicate with any of the sensor nodes 25 via one or more repeaters 39. In this regard, the repeater 39 may receive a signal from either a sensor node 25 or coordinator node 33 and regenerate the signal so that the signal can be transmitted greater distances than would otherwise be possible without the repeater 39. Any of the sensor nodes 25 may similarly regenerate signals and, therefore, perform the functionality described above for repeater 39. For example, one of the sensor nodes 25 may regenerate and transmit a signal received from either another of the sensor nodes 25 or the repeater 39. Similarly, a signal transmitted by the coordinator node 33 may be received and regenerated by either a sensor node 25 or repeater 39 before ultimately being received by a destination sensor node 25. Further, any signal may be regenerated numerous times before being received by its intended final destination node.

Note that each node 25, 33 is associated with an identifier that uniquely identifies such node from other nodes in the network 20. Any signal destined for a node preferably includes the node's unique identifier so that any node receiving the signal can determine whether it is the signal's destination. If it is the destination, then the node responds to the signal as appropriate. For example, if a message identifying a particular sensor node 25 defines a command to perform an action, then identified node 25, upon receiving the signal, is configured to further process the signal based on the node identifier of the signal and to thereafter perform the commanded action.

In one exemplary embodiment, each sensor node 25 registers with the coordinator node 33 upon power-up. For example, upon power-up, a sensor node 25 may broadcast a message indicating that it is searching for a network to join. In response to the message, the coordinator node 33 stores data indicating that the node 25 is now part of the network 20 and transmits a reply message to such node 25. The coordinator node 33 may also transmit commands and/or data to enable any of the sensor nodes 25 to perform desired functions, such as monitoring various events via a sensor 27 or taking various actions, as instructed by the coordinator node 33 or otherwise.

Figure 2:
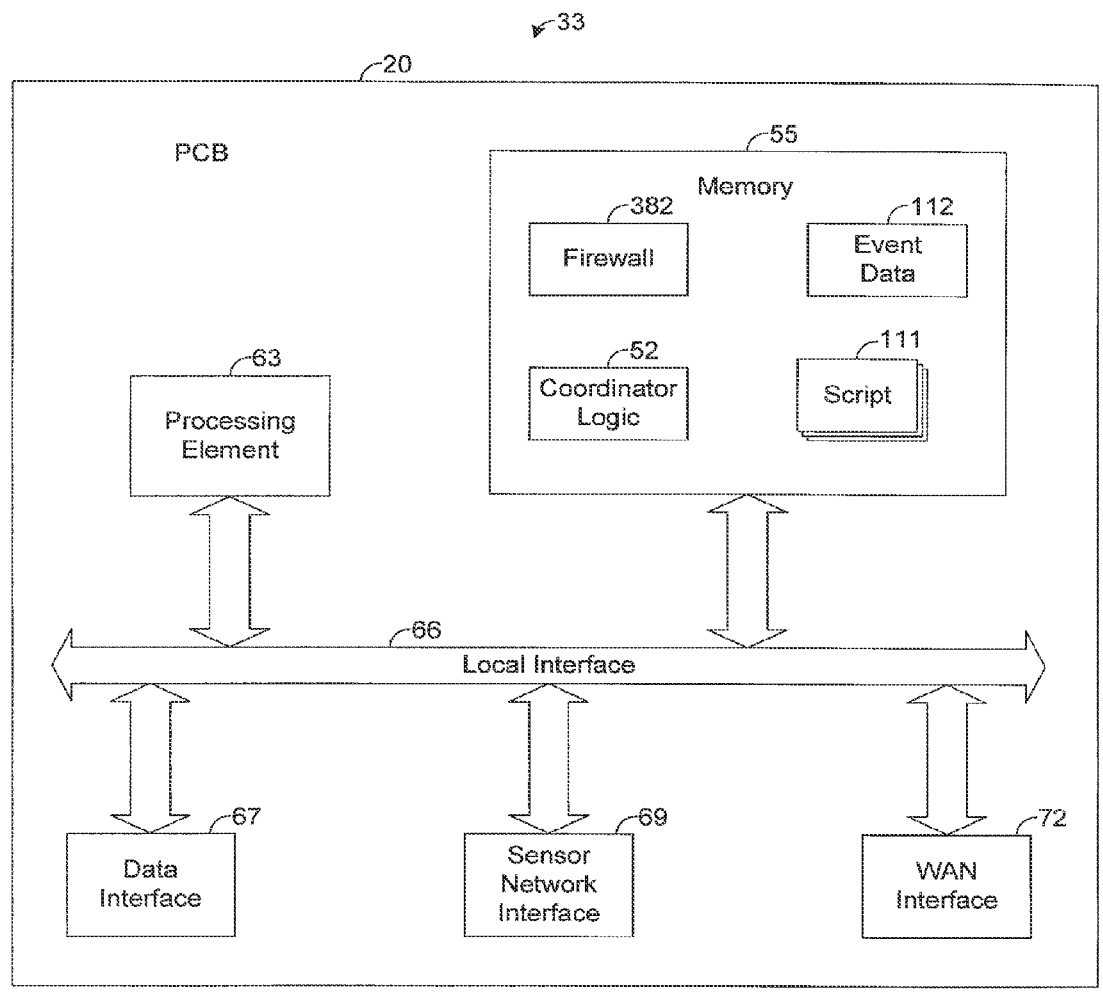
FIG. 2 is a block diagram illustrating an exemplary coordinator node, such as is depicted in FIG. 1.

FIG. 2 depicts a coordinator node 33 in accordance with an exemplary embodiment of the present disclosure. As shown by FIG. 2, the node 33 has coordinator logic 52 for generally controlling the operation of the node 33. The coordinator logic 52 can be implemented in software, firmware, hardware, or any combination thereof. In an exemplary embodiment illustrated in FIG. 2, the coordinator logic 52 is implemented in software and stored in memory 55.

Note that the coordinator logic 52, when implemented in software, can be stored and transported on any computer-readable medium for use by or in connection with an instruction execution apparatus that can fetch and execute instructions. In the context of this document, a "computer-readable medium" can be any means that can contain, store, communicate, propagate, or transport a program for use by or in connection with the instruction execution apparatus.

The exemplary embodiment of the coordinator node 33 depicted by FIG. 2 comprises at least one conventional processing element 63, such as a digital signal processor (DSP) or a central processing unit (CPU), that communicates to and drives the other elements within node 33 via a local interface 66, which can include at least one bus. Furthermore, a data interface 67, such as an universal serial bus (USB) port or RS-232 port, allows data to be exchanged with external devices. For example, the host 36 of FIG. 1 may be coupled to the data interface 67 to communicate with the coordinator logic 52.

The coordinator node 33 also has a sensor network interface 69 for enabling the coordinator logic 52 to communicate with the sensor nodes 25. In at least one exemplary embodiment, the interface 69 is configured to communicate wireless signals, but communication between the nodes may occur over physical media in other embodiments. In at least one embodiment, the sensor network interface 69 communicates wireless RF signals and, for simplicity, will be referred to hereafter as "RF engine." However, in other embodiments, other types of communication devices may be used to implement the interface 69.

In addition, a wide area network (WAN) interface 72 allows the coordinator logic 52 to communicate with a WAN (not shown in FIGS. 1 and 2), such as the Internet. As an example, the WAN interface 72 may comprise a cable or digital subscriber line (DSL) modem or other types of devices commonly used for communication with a WAN. Note that the WAN interface 72 is optional and may be omitted, if desired. In addition, the WAN interface 72 may be coupled to other components of the network 20, such as the host 36, to enable communication between a WAN and the sensor network 20.

Figure 3:
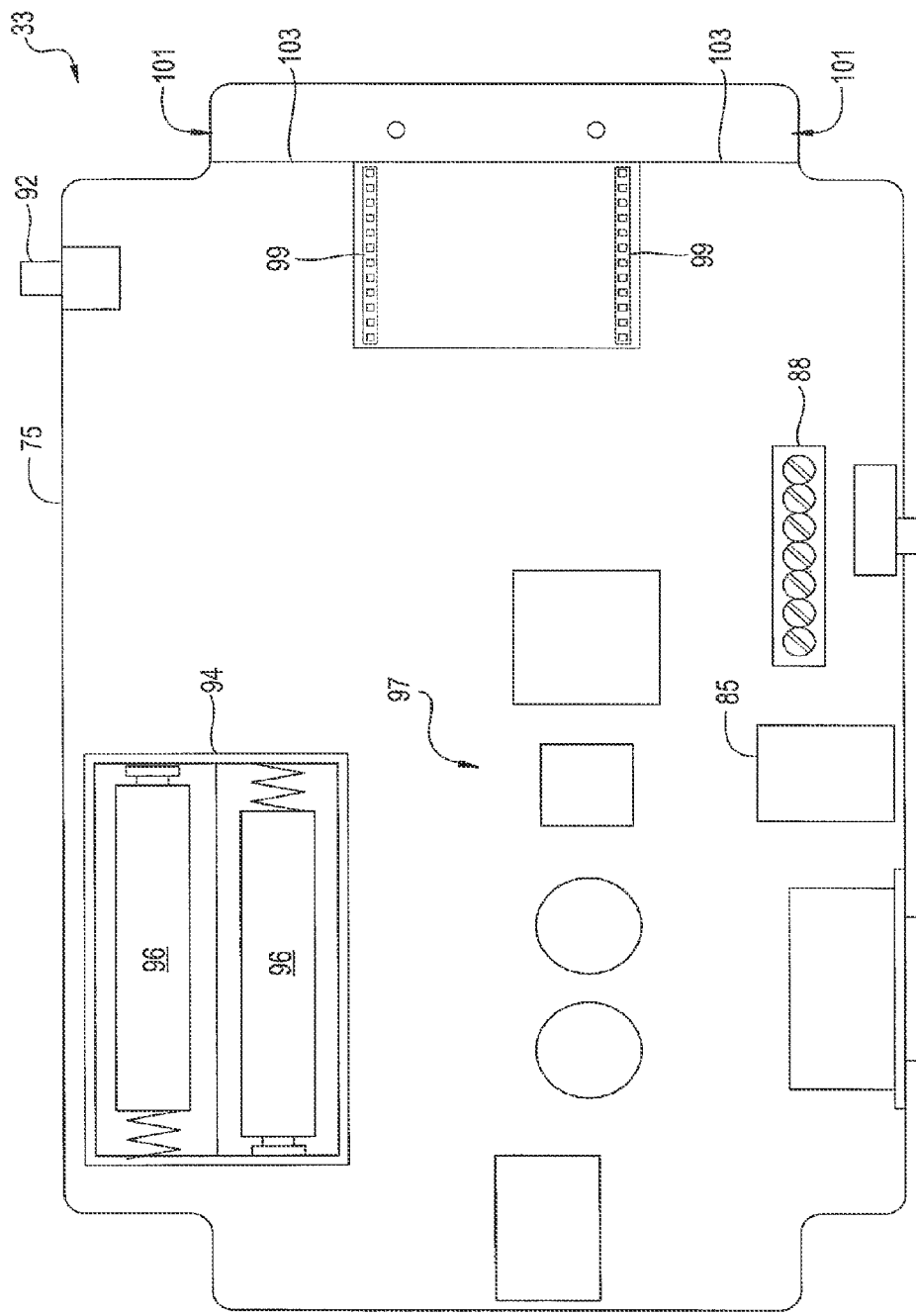
FIG. 3 depicts an exemplary coordinator node, such as is depicted in FIG. 1.

In at least one exemplary embodiment, as shown by FIG. 2, the components of the coordinator node 33 reside on at least one printed circuit board (PCB) 75. FIG. 3 depicts a coordinator node 33 in accordance with an exemplary embodiment of the present disclosure. In the embodiment shown by FIG. 2, the node 33 has an RS-232 port 83 and USB port 85 for enabling communication with the coordinator logic 52 via either of these ports 83, 85. Further, the node 33 has a plurality of analog input/output (I/O) ports 88 that can be coupled to a sensor (not shown), if desired. In this regard, the coordinator node 33, like any of the sensor nodes 25, can receive information and/or control a sensor. In the embodiment shown by FIG. 3, each port 88 has a screw that can be screwed down to secure a wire (not shown) inserted into the port 88. However, other types of I/O ports may be used in other embodiments.

The node 33 also comprises a button 92 for allowing a user to provide a manual input (e.g., reset or on/off). In addition, the node 33 has a battery mount 94 on which one or more batteries (not shown) may be mounted. In the embodiment shown by FIG. 3, a pair of AA batteries 96 may be attached to the mount 94 and used to power circuitry 97 of the node 33. In other embodiments, other numbers and/or types of batteries can be used. In addition, it is possible for any of the components to be powered via other types of power sources. As a mere example, the node 33 may be electrically coupled to a power outlet (not shown) and receive electrical power from such an outlet.

In at least one exemplary embodiment, the RF engine 69 is implemented on a PCB separate from the PCB 75 shown in FIG. 3. In the embodiment depicted by FIG. 3, the PCB 75 has a plurality of female pin connectors 99 for receiving and electrically connecting to pins of the RF engine PCB (not shown in FIG. 3). The RF engine 69 will be described in more detail hereafter.

The PCB 75 has a tab 101 that is removable along a seam 103. If the PCB of the RF engine 69 has an antenna mounted thereon, it may be desirable to remove the tab 101 in an effort to reduce interference to the signals being communicated via such antenna.

As shown by FIG. 2, a portion of the logic of the coordinator node 33 may be implemented via one or more scripts 111, which are sets of user-defined executable code that can be run without compiling. Further, data 112, referred to herein as "event data," is stored in memory 55. The scripts 111 can be used in the control of the sensor nodes 25, and the event data 112 may indicate which scripts 111 are to be invoked in response to which events. For example, one of the scripts 111 may be used to respond to a particular event. In this regard, upon occurrence of the event, the coordinator logic 52 may invoke the script 111, which then causes one or more actions to take place in response to the event.

As a mere example, assume that it is desirable for a motor coupled to one of the sensor nodes 25 to be shut down when a sensor 27 of the same node 25 detects a temperature above a threshold. In such an example, the sensor node 25 may be configured to transmit a notification message when the sensor 27 detects a temperature above the threshold. The coordinator node 33 may receive the message via RF engine 69, and then analyze the event data 112 to determine which script 111 is to be invoked in response to the detected event. The invoked script 111 may then cause a command for shutting down the motor to be transmitted via the RF engine 69 of the coordinator node 33. The foregoing sensor node 25 may receive such command and, in response, shut down the motor. In other examples, other actions and events are possible.

Figure 4:
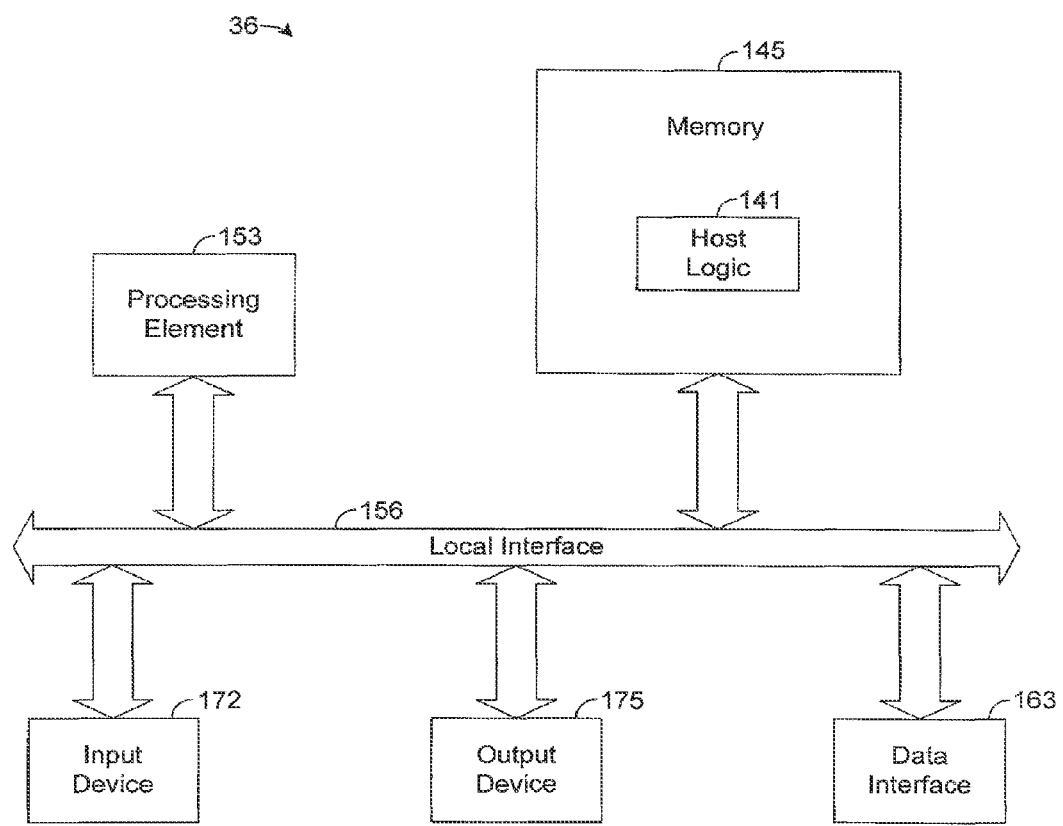
FIG. 4 is a block diagram illustrating an exemplary host, such as is depicted in FIG. 1.

In one exemplary embodiment, the scripts 111 are downloaded to the coordinator node 33 via the host 36 (FIG. 1). FIG. 4 depicts a host 36 in accordance with an exemplary embodiment of the present disclosure. As shown by FIG. 4, the node 33 has host logic 141 for generally controlling the operation of the host 36. The host logic 141 can be implemented in software, firmware, hardware, or any combination thereof. In an exemplary embodiment illustrated in FIG. 4, the host logic 141 is implemented in software and stored in memory 145. Note that the host logic 141, when implemented in software, can be stored and transported on any computer-readable medium for use by or in connection with an instruction execution apparatus that can fetch and execute instructions.

The exemplary embodiment of the host 36 depicted by FIG. 4 comprises at least one conventional processing element 153, such as a digital signal processor (DSP) or a central processing unit (CPU), that communicates to and drives the other elements within host 36 via a local interface 156, which can include at least one bus. Furthermore, a data interface 163, such as an universal serial bus (USB) port or RS-232 port, allows data to be exchanged with external devices. For example, the data interface 163 may be coupled to the data interface 67 (FIG. 2) to enable communication between the coordinator logic 52 of node 33 and the host logic 141.

Furthermore, an input device 172, for example, a keyboard or a mouse, can be used to input data from a user of the host 36, and a display device 175, for example, a printer or monitor, can be used to output data to the user. Any known or future-developed computer, such as a desk-top, lap-top, or personal digital assistant (PDA), may be used to implement the host 36. In addition, it is possible for the host 36 and coordinator node 33 to communicate via wireless signals or to communicate over physical media.

In at least one exemplary embodiment, the host 36 communicates with the coordinator node 33 via AT messaging, and a user may use the host 36 to configure the coordinator logic 141 and, in particular, how the coordinator 141 responds to various events. For example, the user may download a script 111 (FIG. 2) that, when executed, causes the coordinator node 33 to control an aspect of the network 20, such as taking some action, in response to an event. The user may also specify when the script 111 is to be executed. For example, the user may input data indicating that the downloaded script 111 is to be executed when a particular event, such as a sensor 27 sensing a particular temperature or other parameter, occurs. Such data is stored in memory 55 (FIG. 2) as event data 112. In this regard, the event data 112 correlates the scripts 111 with various events. Thus, when the coordinator logic 52 receives, from a sensor node 25, a message that the particular event has occurred, the coordinator logic 52 analyzes the data 112 to determine which script 111 is correlated with the detected event. The logic 52 then invokes the correlated script 111, which then causes the coordinator node 33 to perform some action, such as instructing a sensor node 25 to perform a particular action.

Figure 5:
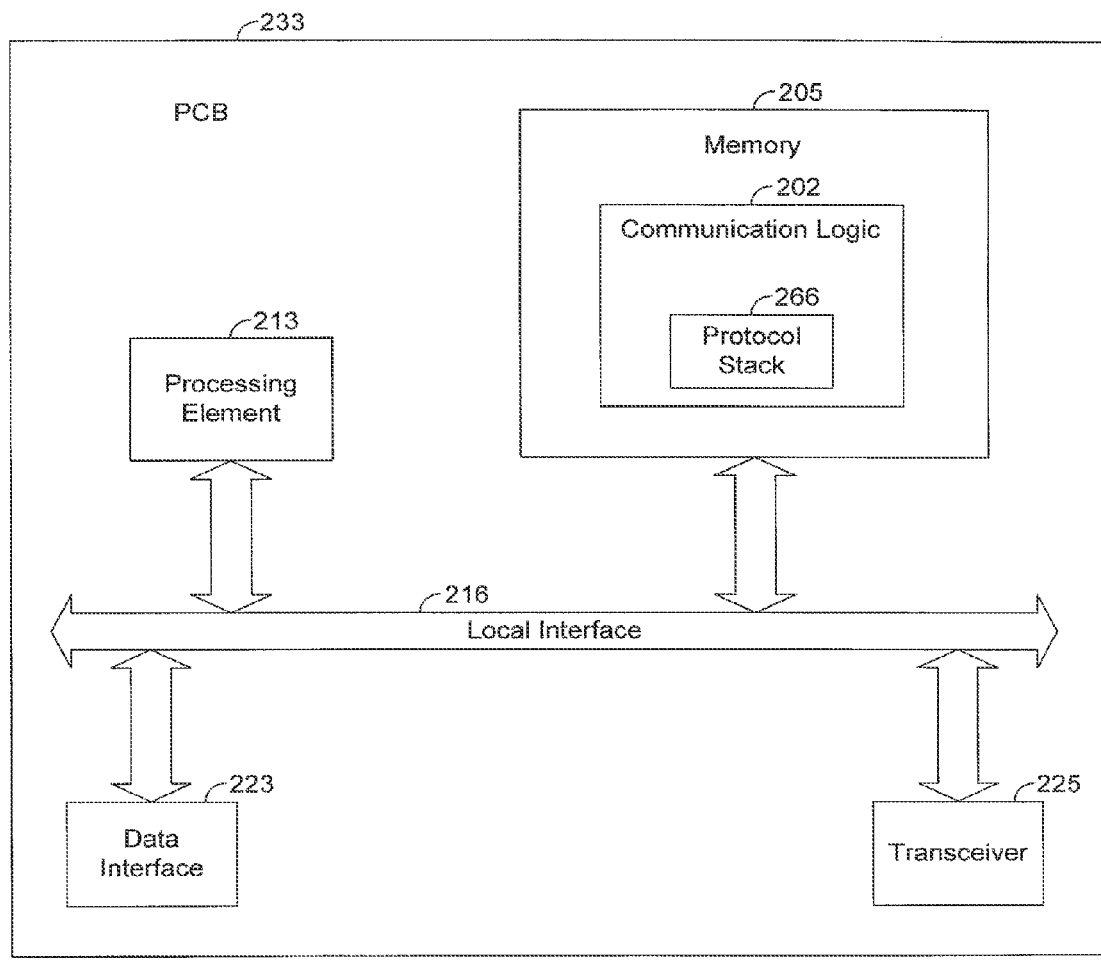
FIG. 5 is a block diagram illustrating an exemplary sensor network interface, such as is depicted in FIG. 2.

FIG. 5 depicts an RF engine 69 in accordance with an exemplary embodiment of the present disclosure. As shown by FIG. 5, the RF engine 69 has communication logic 202 for generally controlling the operation of the RF engine 69. The communication logic 202 can be implemented in software, firmware, hardware, or any combination thereof. In an exemplary embodiment illustrated in FIG. 5, the communication logic 202 is implemented in software and stored in memory 105. Note that the communication logic 202, when implemented in software, can be stored and transported on any computer-readable medium for use by or in connection with an instruction execution apparatus that can fetch and execute instructions.

The exemplary embodiment of the RF engine 69 depicted by FIG. 5 comprises at least one conventional processing element 213, such as a digital signal processor (DSP) or a central processing unit (CPU), that communicates to and drives the other elements within RF engine 69 via a local interface 216, which can include at least one bus. Furthermore, a data interface 223, such as a plurality of I/O pins, allows data to be exchanged with components of the coordinator node 33 residing on PCB 75 (FIG. 2). A transceiver 225 is configured to communicate with the sensor nodes 25. In at least one exemplary embodiment, the transceiver 225 is configured to communicate wireless RF signals, although the transceiver may communicate over physical media and/or signals in other frequency ranges in other embodiments. In at least one exemplary embodiment, the components of the RF engine 69 reside on a PCB 233, which plugs into the PCB 75 of FIG. 2 via data interface 223.

Figure 6:
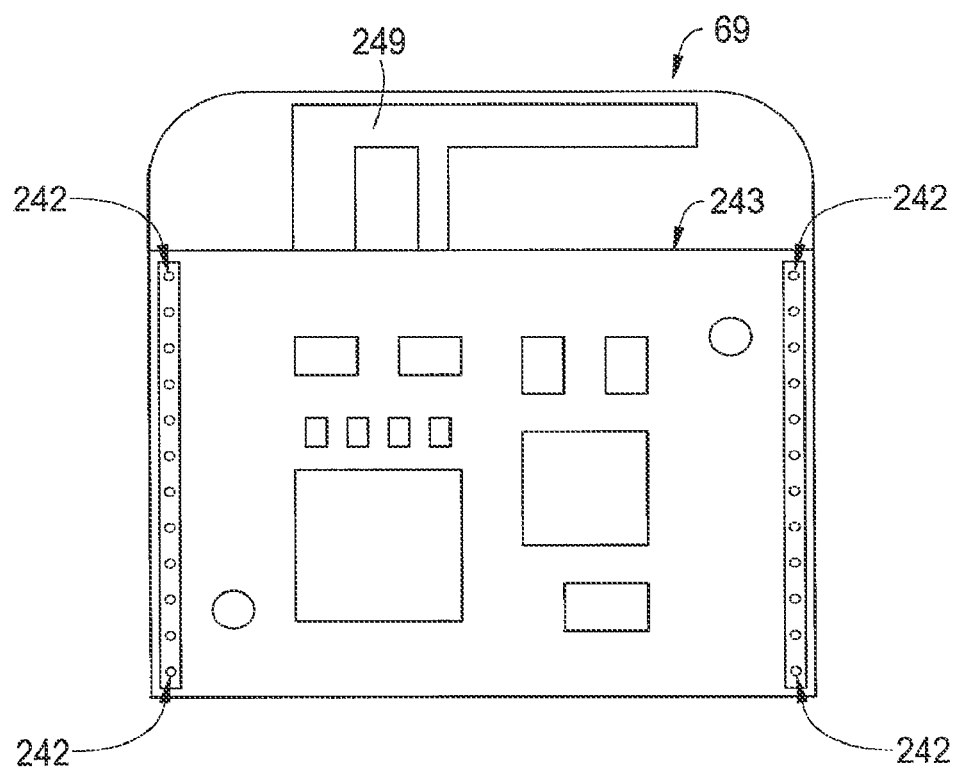
FIG. 6 depicts an exemplary sensor network interface, such as is depicted in FIG. 2.

FIG. 6 depicts an RF engine 69 in accordance with an exemplary embodiment of the present disclosure. As shown by FIG. 6, the RF engine 69 has a plurality of conductive I/O pins 242 that are connectable with the female connectors 99 depicted by FIG. 3. By inserting the pins 242 into the female connectors 99, circuitry 243 of the RF engine 69 is electrically coupled to the circuitry 97 residing on the PCB 75 (FIG. 3).

FIG. 6 also shows an antenna 249 that is used for wireless communication with the sensor nodes 25. When the RF engine 69 is mounted on the PCB 75 by inserting the pins 242 into female connectors 99, the antenna 249 faces the tab 101, if the tab 101 has not been removed. However, as noted above, removing the tab 101 may help to improve the quality of signals transmitted and/or received via antenna 249. FIG. 6 shows an antenna 249, commonly referred to as an "F antenna," but other types of antennas may be employed in other embodiments. Embodiments of an exemplary RF engine 69 are described in more detail in U.S. Provisional Patent Application No. 60/915,536 and in commonly-assigned U.S. patent application Ser. No. 12/114,546, entitled "Wireless Communication Modules," and filed on May 2, 2008, which is incorporated herein by reference.

The RF engine 69 is configured to enable communication with the other nodes of the sensor network 20. Thus, if the coordinator logic 52 is to transmit a message to any of the sensor nodes 25, the coordinator logic 52 provides the RF engine 69 with sufficient information to define the message, and the RF engine 69 wirelessly transmits such message to the sensor nodes 25. Further, the RF engine 69 may implement a protocol that ensures reliable reception of messages via the use of acknowledgements and other status messaging.

In at least one exemplary embodiment, the coordinator logic 52 is configured to communicate with the RF engine 69 via AT messaging, like the AT messaging that may be used by the user to communicate between the host 36 and node 33. Further, the scripts 111 are written in the Python programming language. In other embodiments, other types of messaging and programming languages may be used.

As shown by FIG. 5, the communication logic 202 comprises a protocol stack 266 that converts the AT messages received from the coordinator logic 52 into wireless signals according to a wireless communication protocol implemented by the stack 266. Exemplary protocols are described in more detail in U.S. Provisional Patent Application No. 60/915,458, "Protocols for Wireless Communication," and filed on May 2, 2007, which is incorporated herein by reference. In addition, wireless signals received by the RF engine 69 are converted by the protocol stack 266 into AT messages for the coordinator logic 52.

Figure 7:
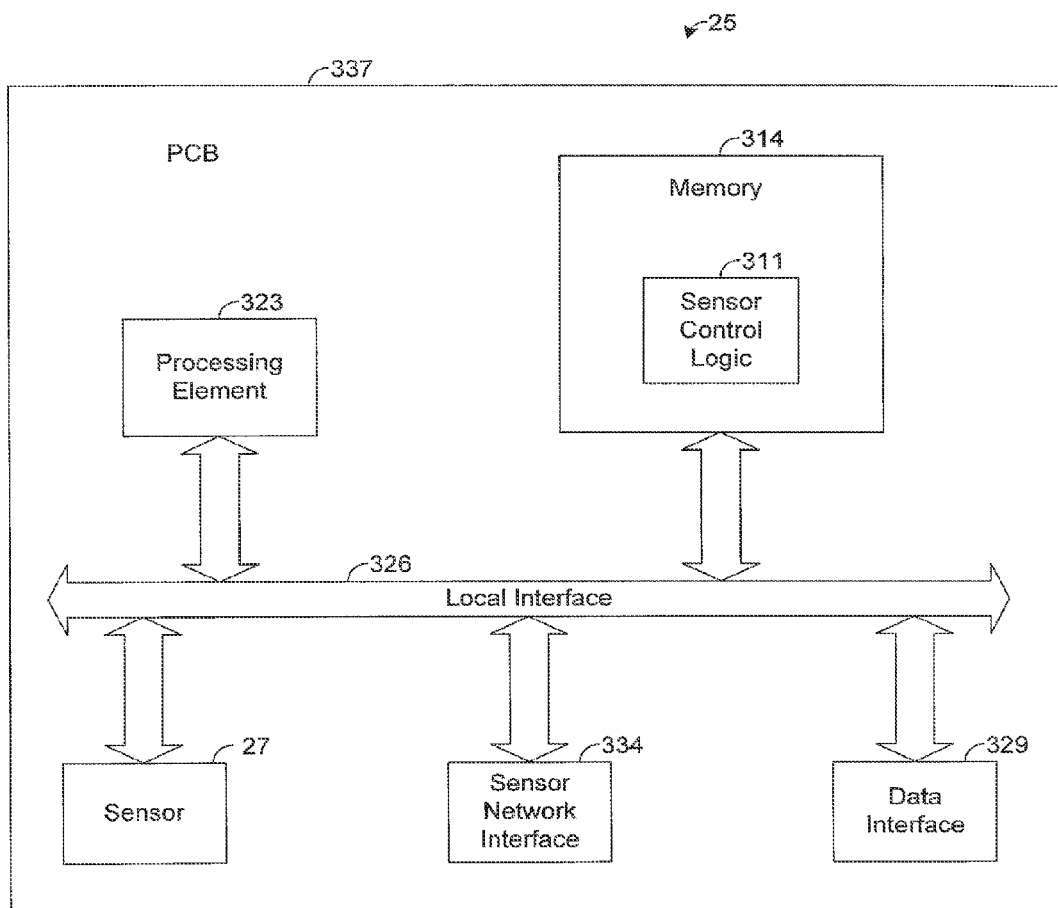
FIG. 7 is a block diagram illustrating an exemplary sensor node, such as is depicted in FIG. 1.

FIG. 7 depicts a sensor node 25 in accordance with an exemplary embodiment of the present disclosure. As shown by FIG. 7, the node 25 has sensor control logic 311 for generally controlling the operation of the node 25. The sensor control logic 311 can be implemented in software, firmware, hardware, or any combination thereof. In an exemplary embodiment illustrated in FIG. 7, the sensor control logic 311 is implemented in software and stored in memory 314. Note that the sensor control logic 311, when implemented in software, can be stored and transported on any computer-readable medium for use by or in connection with an instruction execution apparatus that can fetch and execute instructions.

The exemplary embodiment of the sensor node 25 depicted by FIG. 7 comprises at least one conventional processing element 323, such as a digital signal processor (DSP) or a central processing unit (CPU), that communicates to and drives the other elements within node 25 via a local interface 326, which can include at least one bus. Furthermore, a data interface 329, such as an USB port or RS-232 port, allows data to be exchanged with external devices.

The sensor node 25 also has a sensor network interface 334 for enabling the sensor control logic 311 to communicate with other nodes, such as coordinator node 33. In one exemplary embodiment, the interface 334 is configured to communicate wireless signals, but communication may occur over physical media in other embodiments. In at least one embodiment, the sensor network interface 334 communicates wireless RF signals and, for simplicity, will be referred to hereafter as "RF engine." However, in other embodiments, other types of communication devices may be used to implement the interface 334.

In addition, like the coordinator node 33, the sensor node 25 of FIG. 7 comprises a PCB 337 on which the components of the node 25 reside. The hardware components of the sensor node 25 may be identical or similar to that of the coordinator node 33. Moreover, in at least one exemplary embodiment, the hardware components of any of the nodes may be used interchangeably with any of the other nodes. However, the software and/or data stored in a node 25, 33 may be uniquely tailored to the intended function of the node.

The RF engine 334 of the sensor node 25 may be identical to the RF engine 69 of the coordinator node 33. Moreover, any of the RF engines described herein may be used interchangeably with any of the nodes 24, 33. When an RF engine 69, 334 is mounted on a node, such RF engine enables wireless communication for the node.

In this regard, the RF engine 334 has a protocol stack that implements the same protocol implemented by the protocol stack 266 of the RF engine 69 shown in FIG. 5. Thus, each node 25, 33 uses the same protocol for wireless communication with the other nodes. Further, like the manner in which the RF engine 69 communicates with coordinator logic 52, the RF engine 334 of the sensor node 25 communicates with the sensor control logic 311 via AT messaging, but other types of messaging may be used in other embodiments.

Note that any of the sensor nodes 25 can be configured, at least to some extent, by the coordinator node 33. In this regard, the coordinator node 33 may transmit scripts and/or data that is used by a sensor node 25 for controlling the operation of such node 25. As a mere example, one of the sensor nodes 25 may be configured to receive readings from a sensor 27 and to compare the readings to a threshold. If a reading exceeds the threshold, then the sensor control logic 311 is configured to transmit a notification to the coordinator node 33. However, it is unnecessary for the threshold to be defined before the sensor node 25 joins the network 20. In this regard, once the node 25 joins the network 20, the coordinator node 33 may transmit information to the sensor node 25 instructing the node 25 that it is to monitor readings from its sensor 27, as described above. Such information may include the threshold that is to be used to trigger a notification message to the coordinator node 33. In other examples, other types of techniques for configuring and/or controlling the sensors nodes 25 are possible.

For example, in at least one exemplary embodiment, the coordinator node 33 wirelessly transmits scripts to a sensor node 25 in order to configure the sensor node 25 to perform a desired function. As a mere example, assume that it is desirable for a particular node 25 to monitor readings from a sensor 27 and to transmit a notification to the coordinator node 33 when the current reading from the sensor 27 exceeds a threshold. In such an example, a user may download, via host 36, a script that, when executed by the sensor node 25, causes it to monitor readings from the sensor 27 and to transmit a notification if the current reading exceeds a threshold. The coordinator node 33 receives the script from the host 36 and wirelessly transmits the script to the sensor node 25 via the RF engine 69 of the coordinator node 33. The RF engine 334 (FIG. 7) of the sensor node 25 receives the script, and the sensor control logic 311 stores the script in memory 314. The logic 311 then invokes the script such that, if a reading from the sensor 27 exceeds the threshold, then the script causes the sensor node 25 to transmit a notification to the coordinator node 33. Scripts for performing other functions may be wirelessly transmitted to any of the sensor nodes 25 in other embodiments. For example, rather than transmitting a notification to the coordinator node 33, the script may cause the sensor node 25 to take some action, such as controlling an operational state of the device 31 being monitored by the sensor 27.

It should be observed that the use of scripts can enable the behavior of the network 20 to be dynamically configured from a central location, such as the host 36 or coordinator node 33 or otherwise. For example, to have any node 25, 33 perform a new function, a user can define at least one new script, which then is used to cause the node 25, 33 to perform a function that, prior to the introduction of the script, the node 25, 33 was unable to perform. In such way, the behavior of the node 25, 33 can be dynamically changed. Further, since scripts can be communicated over the network 20 from node-to-node, it is unnecessary for the user to physically access the node whose behavior is being modified. Instead, the user can download the script at a central location or otherwise, and the script can be communicated to any node 25, 33 over the network 20 as may be desired.

To better illustrate the foregoing, assume that one of the sensor nodes 25 is coupled to a sensor 27 for monitoring the temperature of a motor. Further assume that the sensor control logic 311 (FIG. 8) of such node 25 is initially configured to monitor the sensed temperatures and report to the coordinator node 33 when a temperature above a threshold, "$TH_1$," is sensed. When the coordinator node 33 receives a message indicating that $TH_1$ has been exceeded, the coordinator node 33 transmits a command to the node 25 instructing it to shut down the motor by activating a relay.

Assume also that the motor is in close proximity to a fan that is also coupled to the foregoing sensor node 25. At some a point, a user may decide that it would be desirable for the fan to be activated before the temperature of the motor reaches $TH_1$ in an effort to cool the motor and reduce the likelihood that $TH_1$ will, in fact, be reached. In such an example, the user can reconfigure the system 20, such that it behaves as desired, from a central location or otherwise without physically accessing the node 25 that is coupled to the fan. There are various ways that the foregoing could be performed.

In one example, the user downloads one or more scripts, referred to as "new scripts," to the coordinator node 33 via host 36. At least one of the new scripts causes the coordinator node 33 to communicate with the sensor node 25 that is coupled to the motor and fan and to instruct the sensor node 25 to notify the coordinator node 33 when a new threshold, "$TH_2$," is exceeded, where $TH_2$ is less than $TH_1$. The at least one new script also causes the coordinator node 33 to update the event data 112 (FIG. 2) to indicate that one of the new scripts is to be invoked in response to a message from the node 25 indicating that $TH_2$ has been exceeded.

Note that there are various ways that the sensor node 25 could be configured to notify the coordinator node 33 when $TH_2$ is exceeded. For example, in one exemplary embodiment, data defining the thresholds that the sensor control logic 311 monitors is stored in memory 314. If a sensed temperature exceeds any one of the thresholds, the sensor control logic 311 is configured to notify the coordinator node 33. Moreover, in response to a command from the coordinator node 33 including $TH_2$, the sensor control logic 311 (FIG. 8) is configured to add $TH_2$ to the list of thresholds stored in the sensor node 25. Accordingly, by comparing the sensed temperatures to the updated threshold list, the sensor control logic 311 determines that a notification message is to be transmitted to the coordinator node 33 when $TH_2$ is exceeded. In other examples, other techniques may be used to determine when notification messages are to be transmitted to the coordinator node 33.

Moreover, when $TH_2$ is exceeded by a sensed temperature at the node 25, the node 25 transmits a message indicative of this event, and the coordinator logic 52, in response to such message, checks the event data 112. Based on the event data 112, the coordinator logic 52 invokes the new script identified by the data 112 for this event, and the new script, when invoked, causes the node 33 to transmit a message to the sensor 25 instructing this node 25 to activate the fan. In response, the sensor node 25 activates the fan possibly preventing $TH_1$ from being reached and, therefore, possibly preventing the motor from being shut down.

It should be observed that a new function in the current example (e.g., activating the fan when $TH_2$ is exceeded) is enabled by defining one or more new scripts and inputting such scripts to the system 20 without physically accessing the node 25 that actually activates the fan. Via similar techniques, the behavior of any node 25, 33 in the system 20 can be dynamically changed from a central location or otherwise without having to manually access each of the nodes 25, 33 being changed.

Note that, if desired, at least some scripts can be transmitted to the sensor nodes 25 and run on the sensor nodes 25. For example, consider the previous example in which a fan coupled to a sensor node 25 is activated when a motor temperature exceeds $TH_2$. Rather than running one or more new scripts at the coordinator node 33, the coordinator logic 52 instead can be configured to transmit the one or more new scripts, via the RF engine 69, to the node 25 whose behavior is to be changed based on the new scripts. Such scripts can be stored at the sensor node 25.

In such an example, at least one of the new scripts, when executed, may cause the sensor control logic 311 (FIG. 7) to begin monitoring the sensed temperatures for sensing when they exceed $TH_2$. For example, data defining the thresholds that the sensor control logic 311 monitors may be stored in memory 314, and at least one of the new scripts may add $TH_2$ to this list of thresholds. Thus, the sensor control logic 311 is aware that some action is to be performed when $TH_2$ is exceeded. Further, similar to the event data 112 (FIG. 2) stored in the coordinator node 33, event data may be stored in the node 25. Such data may indicate what action is to be performed in response to an event, such as a threshold being exceeded. Such data may be updated by one or more of the new scripts to indicate that at least one of the new scripts is to be invoked if $TH_2$ is exceeded. Thus, when the sensor control logic 311 detects that $TH_2$ has been exceeded, the logic 311 invokes at least one of the new scripts, which causes the node 25 to activate the fan.

Figure 9:
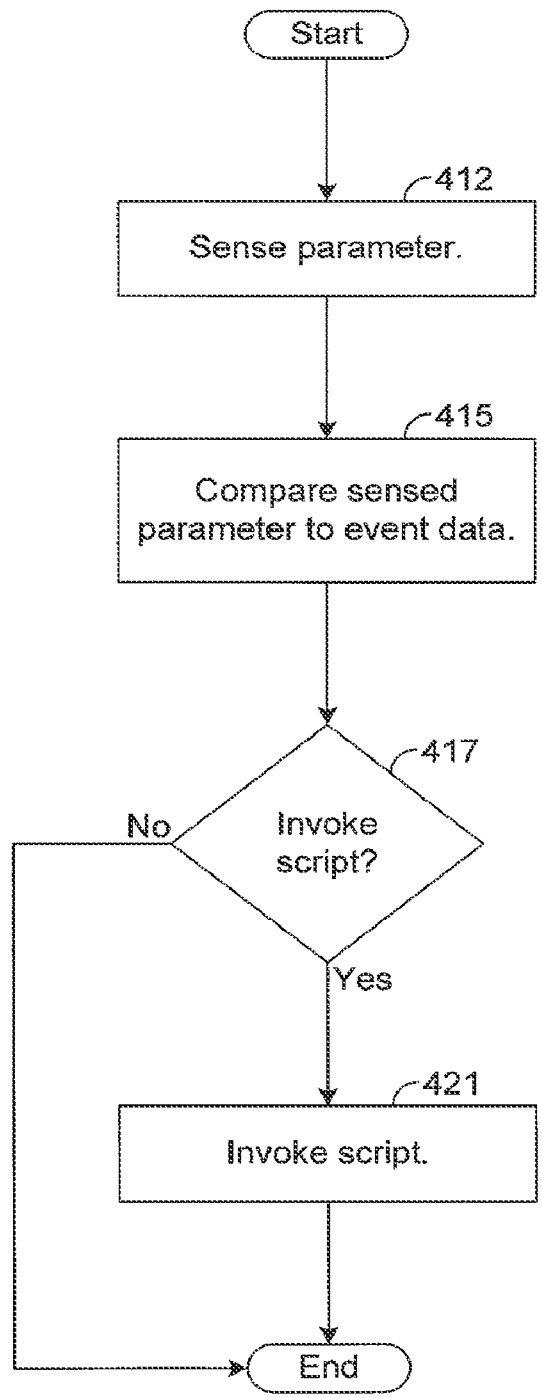
FIG. 9 is a flow chart illustrating an exemplary method for invoking scripts based on parameters sensed by nodes of a sensor network.

FIG. 9 illustrates an exemplary method for invoking scripts based on parameters sensed by nodes of a sensor network. The method will be described in the context of the above example in which a script for activating a fan, referred to hereafter as the "fan activation script," is stored and run on a sensor node 25. Node that the method shown by FIG. 9 may be used in other examples as well.

Referring to FIG. 9, a node's sensor 27 senses an operational parameter of the device 31 being monitored as shown by block 412. In the instant example, the sensor 27 senses the device's temperature. As shown by block 415, the node's sensor control logic 311 compares the sensed parameter to the node's event data. In the instant example, the logic 311 compares the sensed parameter to $TH_1$ and $TH_2$, which are defined by the event data stored at the node 25. As shown by block 417, the logic 311 determines whether to invoke the fan activation script based on the comparison performed in block 415. In this regard, if the sensed temperature is above $TH_2$ and below $TH_1$, then the logic 311 invokes the fan activation script in block 421. Running of the fan activation script on the sensor node 25 (e.g., on the processing element 323) causes the node 25 to activate the fan.

As illustrated above, there are many different ways that the behavior of the system 20 can be dynamically changed so that new functions can be added or old functions can be altered. Indeed, the system 20 can be changed in ways that the original designer or administrator never even contemplated when the system 20 was originally created. Further, although it is possible to change the behavior of any node 25, 33 by physically accessing the node and reconfiguring the node (such as inputting new code into the node), the system 20 allows a user to remotely alter the configuration of any node 25, 33 from a remote location, such as the host 36 or coordinator node 33, by writing and downloading new scripts that can be distributed as desired to any node 25, 33.

Note that the script and/or other data for controlling the operation of the sensor node 25 may be input directly to the RF engine 69 of the coordinator node 33 without being input via the RS-232 port 83, the USB port 85, or other interface mounted directly on the PCB 75. In this regard, it is possible for the RF engine 69 to have an RS-232 port or other type of interface mounted directly on the PCB 233 (FIG. 5) so that use of an interface mounted directly on the PCB 75 is unnecessary.

In addition, in various examples described above, the scripts are described as enabling and/or performing threshold checking and various other simple operations, such as controlling the activation state of a fan. However, complex functions can be enabled and/or performed by the scripts in other examples. Indeed, a script may generally include if-then-else clauses, for-next constructs, do-while loops and/or various other constructs or program statements. Moreover, any of the scripts described herein may be used to enable and/or perform any type of function that may be desired for a particular application. Furthermore, the techniques described herein may be used in various types of networks, such as star networks and mesh networks, for example.

Figure 8:
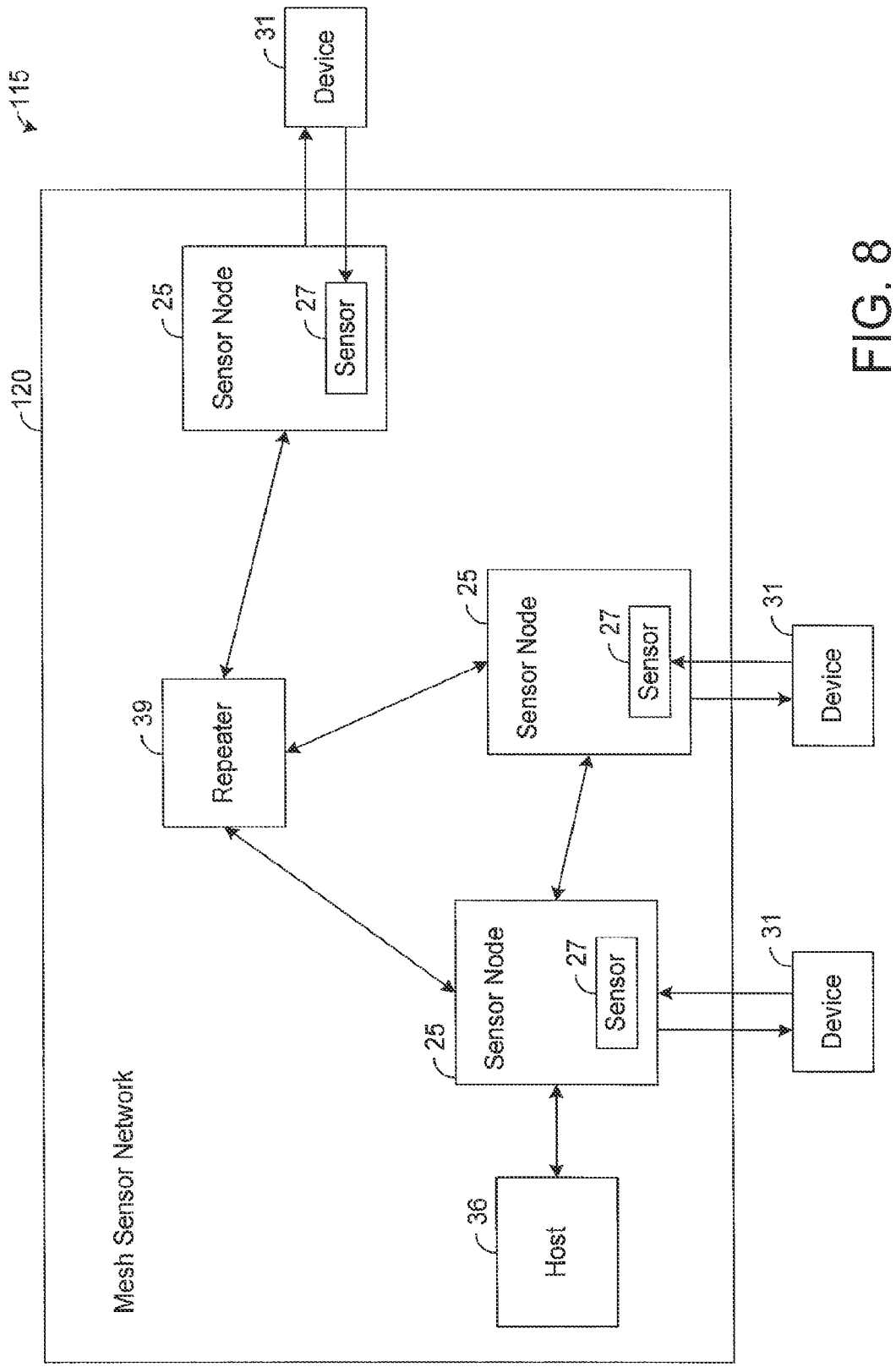
FIG. 8 is a block diagram illustrating a mesh network in accordance with an exemplary embodiment of the present disclosure.

Indeed, FIG. 8 depicts a system 115 that utilizes an exemplary sensor network 120, which is implemented as a mesh network. In this regard, the host 36 can interface with any of the sensor nodes 25 of the network 120 in order to monitor or change the configuration of the network 120. For example, assume that the host 36 is interfaced with one of the sensor nodes 25, referred to hereafter as the "interfaced node." The host 36 may download scripts directly to the interfaced node 25 in order to affect the behavior of such node 25. Also, the host 36 may instruct the interfaced node to communicate a script to another node 25 in order to change the behavior of this other node 25. Accordingly, any of the sensor nodes 25 can be configured to perform at least some of the functionality described above for the coordinator node 33 of FIG. 1.

In one exemplary embodiment, sensor network interface 334 (FIG. 7) of each sensor node 25 has a virtual machine (not specifically shown), which is a bytecode interpreter. Further, the scripts transmitted to the sensor nodes 25 are transmitted in format requiring no translation before running on the node's virtual machine. Moreover, any node 25 may call a script on any other node 25 using a remote procedure call (RPC) and cause such other node 25 to run the called script. Other techniques for communicating, invoking, and running scripts are possible in other embodiments.

When a sensor node 25 is monitoring readings from a sensor 27, the sensor node 25 can be configured to notify the coordinator node 33 of certain events in a variety of ways. For example, it is possible for the sensor node 25 to be configured to periodically transmit readings from the sensor 27, and the coordinator node 33 may be configured to analyze such readings to determine if any actions should be taken. However, in some examples, it may be desirable for the sensor node 25, in monitoring the sensor 27, to transmit a notification only when the current reading from the sensor 27 exceeds or falls below a threshold. In such an example, the sensor node 25, in monitoring the sensor 27, may be so configured such that it transmits a notification only if the current sensor reading exceeds or falls below a specified threshold. Such a monitoring technique may help to reduce traffic on the network 20 and also help to conserve the power of the sensor node 25, since transmissions to the coordinator node 33 may be limited.

By using well-known messaging schemes, such as AT messaging, and programming languages, such as Python, for the scripts 111, it is possible that at least some users can configure the sensor network 20 without having to learn a new communication protocol or program language. In fact, it is possible for a user to configure the sensor network 20 without an intimate knowledge of the wireless protocol implemented by the protocol stack 266 since conversion of messages into and out of such protocol is automatically performed by the stack 266. Further, it is unnecessary for any such user to design many of the aspects of the wireless communication occurring between the nodes 25, thereby greatly simplifying the design and installation of a reliable sensor network 25.

As described above, in at least some embodiments, the sensor network 20 is coupled to and communicates with a WAN, such as the Internet. In this regard, in at least one embodiment, the coordinator node 33 has a WAN interface 72 that enables communication with a WAN. In other embodiments, the WAN interface 72 may be coupled to other components of the sensor network 20.

Figure 10:
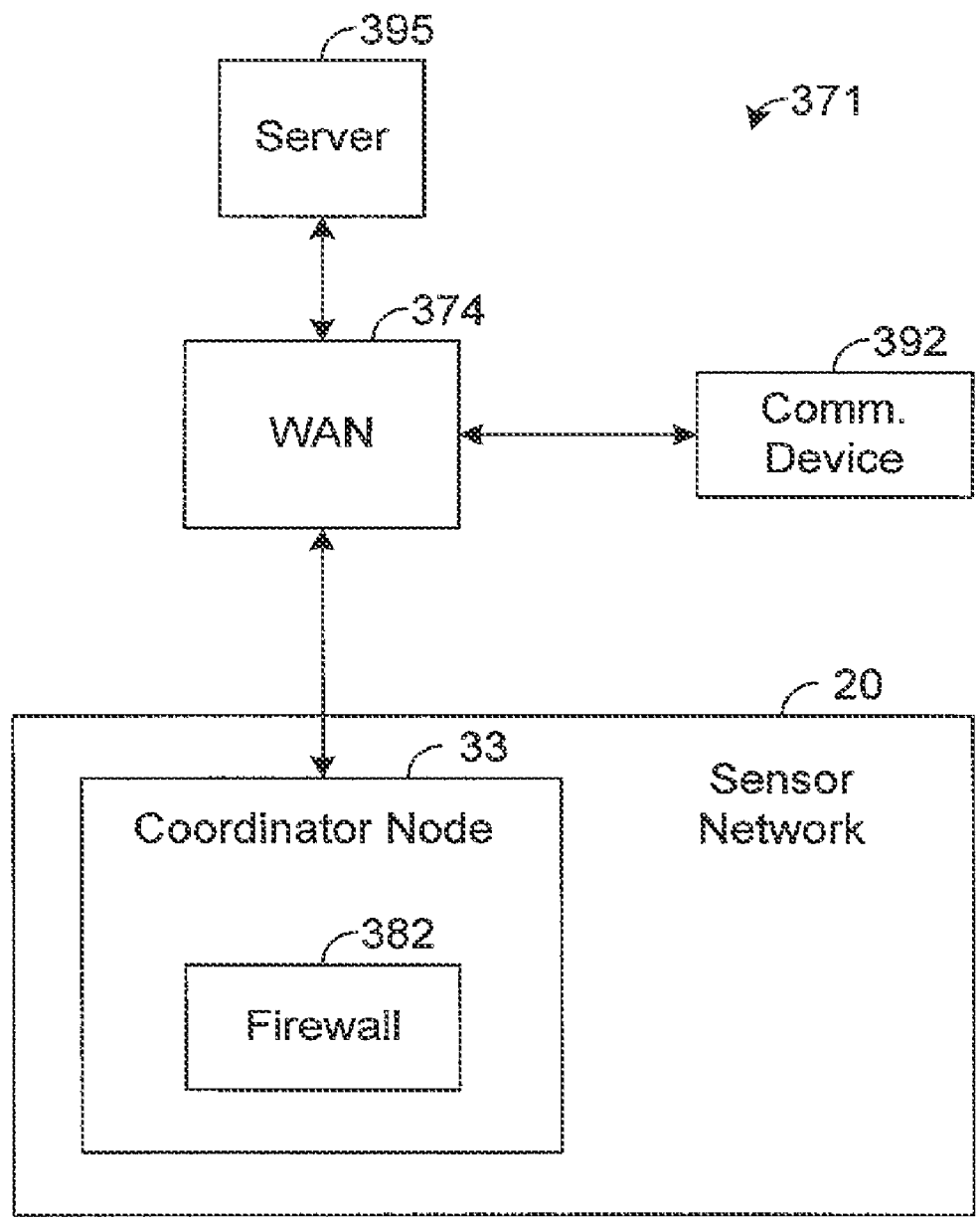
FIG. 10 is a block diagram illustrating an exemplary communication system comprising an exemplary sensor network, such as is depicted in FIG. 1.

FIG. 10 depicts an exemplary embodiment of a communication system 371 in which a WAN 374, such as the Internet, is coupled to the coordinator node 33. The coordinator node 33 has a firewall 382 that helps to protect the sensor network 20 and, in particular, the node 33 coupled to the WAN 374 from security threats. In this regard, the firewall 382 may filter messages received from the WAN 374 to remove viruses and/or to prevent harmful or objectionable messages from reaching the coordinator node 33. In addition, the firewall 382 may be configured to restrict access to the coordinator node 33 in an effort to prevent unauthorized third parties for accessing the node 33 and/or other components of network 20. As shown by FIG. 2, the firewall 382 is implemented in software, although such component may be implemented in hardware, firmware, or any combination of hardware, firmware, and software in other embodiments. Firewalls are generally well-known in the art and, for the purposes of brevity, will not be described in more detail herein. However, any known or future-developed firewall may be used to protect the components of the network 20.

A user remote from the network 20 may discover the status of the network 20 or any component of the network 20 using a remote communication device 392, assuming that such user is authorized to access the network 20. For example, the user may use the remote communication device 392 to transmit messages, via WAN 374, destined for the node 33 requesting various status information about the network 20. However, the firewall 382 may create some difficulties in accessing the network 20, particularly if the communication device 392 is not recognizable to the firewall 382 (e.g., has not previously been used to communicate through the firewall 382). Thus, to alleviate problems in communicating through the firewall 382, a server 395 is employed to serve as an intermediary between the communication device 392 and the network 20.

The server 395 stores information that can be used to authenticate users who are authorized to access the network 20. Further, the server 395 stores information correlating each authorized user to the IP address of the network 20. In addition, the coordinator logic 52 (FIG. 2) of the coordinator node 33 is configured to establish a persistent connection with the server 395. In this regard, the coordinator logic 52 is configured to initiate communication with the server 395 by transmitting a message destined for the server 395. Since the communication has been initiated by the node 33, the firewall 382 is configured to recognize a message from the same address (i.e., the address of the server 395) as coming from an authorized user or site. Thus, the firewall 382 will not attempt to block any such message coming from server 395. However, rather than responding to the message initiated by the node 33, the server 395 instead refrains from responding until the server 395 receives, from an authorized user, a request to access the network 20.

In this regard, when a user wishes to access the network 20, the user transmits a message to the server 395 via communication device 392 and WAN 374. The message includes sufficient information (e.g., username, password, etc.) to enable the server 395 to authenticate the user. If the user is authenticated, the server 395 then communicates with the network 20 using the persistent connection previously established by the node 33. In this regard, the server 395 transmits any requests from the user to the network 20 via the persistent connection previously established by the node 33. Since the firewall 382 recognizes the server's address in such messages, the firewall 382 does not block the messages transmitted from the server 395. Any data returned to the server in response to such requests is forwarded by the server 395 to the communication device 392. Thus, a user of the device 392 is able to access network 20 in order to change the configuration of the network 20 or discover status information about the network 20 without interference or disruptions caused by the firewall 382.

Now, therefore, the following is claimed:

1. A wireless sensor network, comprising:
a first node configured to receive at least one script defining a new behavior for the network, the first node configured to wirelessly transmit the at least one script via the network; and
a sensor node configured to store event data and to receive the at least one script transmitted by the first node, the sensor node having a sensor for detecting an operational parameter of a device, wherein the sensor node via execution of the at least one script is configured to update the event data to indicate that the at least one script is to be invoked if the operational parameter exceeds a threshold, the sensor node further configured to compare the operational parameter to the threshold and to invoke the at least one script based on the event data when the threshold is exceeded by the operational parameter.

2. The network of claim 1, wherein the first node has a printed circuit board (PCB) and a wireless communication module plugged into the PCB, wherein logic residing on the PCB is configured to receive at least one user message defined by user input and comprising the at least one script, wherein the logic is configured to transmit the at least one user message to the wireless communication module, the wireless communication module having an antenna and a protocol stack, the protocol stack configured to receive the at least one user message and to convert the at least one user message into at least one network message compatible with the network, the protocol stack further configured to wirelessly transmit the at least one script via the at least one network message via the antenna.

3. The network of claim 1, wherein running of the at least one script on the sensor node causes the sensor node to control an operational state of the device.

4. The network of claim 1, wherein running of the at least script on the sensor node causes the sensor node to wirelessly transmit a notification to the first node.

5. A method for dynamically changing node behavior for a wireless sensor network, comprising the steps of:
receiving at a first node at least one script defining a new behavior for the network;
wirelessly transmitting the at least one script via the network to a sensor node;
storing event data in the sensor node;
detecting an operational parameter of a device via a sensor of the sensor node;
updating the event data via execution of the at least one script by the sensor node such that the event data indicates that the at least one script is to be invoked if the operational parameter exceeds a threshold;
comparing the operational parameter to the threshold; and
invoking the at least one script based on the event data when the threshold is exceeded by the operational parameter.

6. The method of claim 5, wherein the first node has a printed circuit board (PCB) and a wireless communication module plugged into the PCB, wherein the wireless communication module has a protocol stack and an antenna, and wherein the method further comprises the steps of:
  receiving at least one user message defined by user input and comprising the at least one script;
  transmitting the at least one user message from the PCB to the wireless communication module;
  converting the at least one user message into at least one network message compatible with the network; and
  wirelessly transmitting the at least one script via the at least one network message using the antenna.

* * * * *